UNITED STATES PATENT OFFICE.

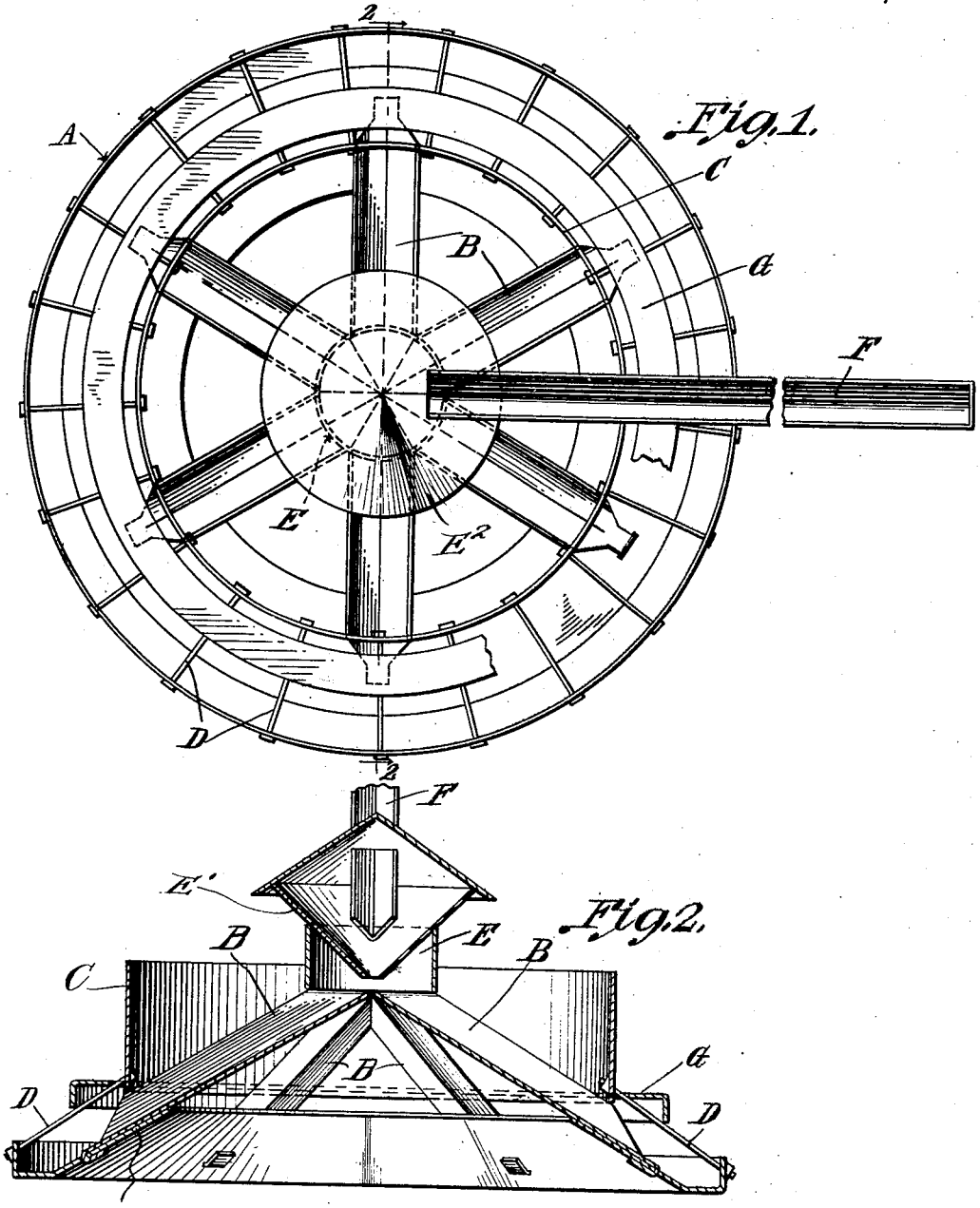

EDWARD AUGUSTUS CASPER AND JOHN KNILL SYMONDS, OF DUNLAP, ILLINOIS.

DEVICE FOR FEEDING SLOP OR SWILL.

1,269,580.             Specification of Letters Patent.        Patented June 18, 1918.

Application filed March 28, 1917. Serial No. 158,101.

*To all whom it may concern:*

Be it known that EDWARD AUGUSTUS CASPER and JOHN KNILL SYMONDS, citizens of the United States, residing at Dunlap, in the county of Peoria and State of Illinois, have invented certain new and useful Improvements in Devices for Feeding Slop or Swill; and they do hereby declare that the following is a full, clear, and exact description of the invention, which will enable others skilled in the art to which it appertains to make and use the same.

This invention relates to a device for feeding slop or swill. It pertains more particularly to a feeding device having a common receptacle in the form of a trough so arranged that the animals feeding therefrom can entirely surround it, there being provided for the same a central hopper for receiving the slop or swill and inclined divergent spouts leading into the trough at positions substantially equally spaced from one another whereby the slop or swill will be fed into the feeding trough at simultaneously practically every part thereof.

One of the objects of the invention is to provide a trough which can be approached by animals from any direction, providing a central hopper for the slop and a series of divergent downwardly inclined spouts leading into said trough, the upper ends of the spouts being brought together directly beneath the outlet from the hopper and so arranged that the slop or swill will be deposited at the juncture of all of said spouts so that the slop or swill will be fed through each to the same extent so that the trough will be fed at substantially all points simultaneously whereby all of the animals feeding from the trough will be supplied at the same time, thus preventing crowding and the likelihood of young pigs being trampled or hurt or forced altogether away from the trough.

Another object is to furnish a protecting member overhanging the trough to prevent the animals getting into said trough, said member being loosely placed in position so that it can be raised out of the way by the snouts of the feeding animals.

Besides the above objects the invention relates to certain details of construction as will appear in the following specification, aided by the accompanying drawing, and made a part of the appended claims.

Figure 1 is a plan of our slop feeding device; and,

Fig. 2 is a sectional elevation of the same on line 2—2, Fig. 1.

A indicates a trough of any desired form, for instance circular, as shown, the outer wall being preferably vertical, the inner wall A' being preferably slanted upwardly toward a central point, as indicated in Fig. 2.

B B indicate a series of spouts which at one end may be suitably secured to the wall A', Fig. 2, all of them being substantially equally spaced from one another. These spouts are upwardly inclined from the trough and converge to a common point, which point is substantially central of the feeding device, and their upper convergent ends are mitered and fitted together, as indicated in the broken lines in plan in Fig. 1, the joints being suitably closed to make a fluid tight job.

C is a housing in the form of a ring, which lies edgewise upon the several spouts B, and D indicates a series of tie-rods extending through said ring and the vertical wall of the trough A. This ring prevents the animals from climbing upon and damaging the feeding device and by means of said tie-rods D also braces the outer wall of the trough, making a thoroughly strong job.

Mounted upon the upper ends of the spouts is a ring E suitably secured to the latter for confining the slop or swill and preventing it escaping, except down the described spouts.

Supported on the said ring is a hopper E' to receive the slop or swill which may be poured into the same from a bucket or other receptacle, or said hopper may be supplied through a spout F and may be provided with a cover $E^2$, if desired. The small end of the hopper is disposed directly over the point of meeting of the several spouts B so that each spout has an equal chance to deliver the slop or swill for delivery to all parts of the trough A simultaneously as explained.

G is a ring of any desired form which lies upon the rods D, for example. It is adapted and arranged to overhang the trough A and its position is such as to prevent the animals stepping into the trough. It is loosely placed in order that the animals feeding from the trough may raise it with the snouts to permit them to freely feed.

Our device is strongly constructed and may be moved from place to place, if desired, and its general structure is such that the animals cannot foul the slop or swill by getting into the trough and transferring mud and the like thereto, nor can they lie down in said trough.

From the fact that the hopper E' converges at its bottom and that its comparatively small outlet is directly over the place of meeting of all of the spouts, the slop or swill placed in said hopper will divide equally so that every part of the trough A, no matter how large it may be, will have an even feed at all points at once so that all the animals feeding around the trough will be fed simultaneously and there will be, therefore, no danger of larger animals crowding out the very small ones or injuring them in any way.

Slight changes may be made in our feeding device such as will suggest themselves to the practical person, all without departing from the main ideas of the invention.

Having thus described our invention, we claim:—

1. A slop feeding device including in its construction a trough, a series of spouts spaced around said trough to discharge into the same and secured at one of their ends with respect thereto, their other ends converging upwardly toward a common point, and a housing overlying the spouts near their lower ends, and bracing means connecting the housing and the trough.

2. A slop feeding device including in its construction a trough, a series of spouts secured at one of their ends thereto and equally spaced from one another, the other ends of the spouts converging and being directed upwardly to a common point higher than said trough, said spouts abutting against one another, a hopper disposed above the abutting spouts, a housing overlying the spouts near their delivery ends, and bracing members connecting the housing and the outer wall of said trough.

3. A slop feeding device including in its construction an endless trough, a series of spouts leading into said trough, a housing overlying the series of spouts, tie-rods connecting the trough and the housing, and a member adapted to rest upon the rods above the trough and free to move vertically.

4. A slop feeding device comprising in its construction, in combination, a ring shaped trough, a spout for discharging material thereinto, an annulus extending around the trough and overhanging it and free to rise and fall at every portion thereof, means to hold the annulus in proper position over said trough, and a support upon which the annulus freely rests.

5. A slop feeding device comprising, in combination, a trough having the form of a ring, a series of spouts at one of their ends spaced around the trough and arranged to discharge material into the same, and at their other ends converging upwardly, a hopper disposed above the convergent ends arranged to discharge material into all of the spouts, and a ring overhanging the trough and free to be lifted at any point thereof, and means on which the said ring freely rests.

In testimony whereof we affix our signatures, in presence of two witnesses.

EDWARD AUGUSTUS CASPER.
JOHN KNILL SYMONDS.

Witnesses:
   H. WINCHESTER,
   R. JONES.

Copies of this patent may be obtained for five cents each, by addressing the "Commissioner of Patents. Washington, D. C."